US009169754B2

(12) United States Patent
Schneider et al.

(10) Patent No.: US 9,169,754 B2
(45) Date of Patent: Oct. 27, 2015

(54) METHOD FOR ENRICHING THE EXHAUST GAS OF AN INTERNAL COMBUSTION ENGINE WITH REDUCING AGENT AND INTERNAL COMBUSTION ENGINE FOR PERFORMING SUCH A METHOD

(71) Applicant: Ford Global Technologies, LLC, Dearborn, MI (US)

(72) Inventors: Matthew Allen Schneider, Aachen (DE); Kim Ford, Basildon (GB); Javier Castellano, Upminster (GB); Dirk Roemer, Cologne (DE); Frank Linzen, Aachen (DE); Yasser Mohamed sayed Yacoub, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 66 days.

(21) Appl. No.: 13/943,586

(22) Filed: Jul. 16, 2013

(65) Prior Publication Data
US 2014/0013727 A1    Jan. 16, 2014

(30) Foreign Application Priority Data
Jul. 16, 2012    (DE) .......................... 10 2012 212 432

(51) Int. Cl.
*F01N 3/00* (2006.01)
*F01N 3/10* (2006.01)
*F02M 25/06* (2006.01)
(Continued)

(52) U.S. Cl.
CPC .............. *F01N 3/035* (2013.01); *F01N 3/0842* (2013.01); *F01N 3/0871* (2013.01); *F01N 3/2066* (2013.01); *F02D 41/029* (2013.01); *F02D 41/123* (2013.01); *F02D 41/3005* (2013.01); *F01N 2610/02* (2013.01); *F01N 2610/03* (2013.01); *F01N 2900/08* (2013.01); *F02D 2041/0012* (2013.01); *Y02T 10/24* (2013.01)

(58) Field of Classification Search
CPC ... F01N 3/0842; F01N 3/0871; F01N 3/2066; F01N 3/208; F01N 2610/02; F01N 2610/03; F02D 41/123; F02D 2041/0012
USPC ................... 60/274, 278, 286, 295, 301, 303; 123/568.11
See application file for complete search history.

(56) References Cited

U.S. PATENT DOCUMENTS

| 5,584,265 A    * | 12/1996 | Rao et al. ....................... 123/1 A |
| 2006/0140819 A1* | 6/2006 | Faas et al. ......................... 422/83 |

(Continued)

FOREIGN PATENT DOCUMENTS

| DE | 19953480 A1 | 5/2001 |
| WO | 2010108574 A1 | 9/2010 |

*Primary Examiner* — Audrey K Bradley
(74) *Attorney, Agent, or Firm* — Julia Voutyras; Alleman Hall McCoy Russell & Tuttle LLP

(57) ABSTRACT

A method for enriching the exhaust gas of an internal combustion engine with a reducing agent is provided, the internal combustion engine including at least one cylinder and having an intake system for admission of charge air, an exhaust gas discharge system for discharging exhaust gases, and at least one exhaust gas aftertreatment system for reducing nitrogen oxides arranged in the exhaust gas discharge system and which is periodically provided with a supply of reducing agent. The method comprises enriching the exhaust gas with the reducing agent in the exhaust gas discharge system upstream of at least the one exhaust gas aftertreatment system when a fuel supply of the at least one cylinder of the internal combustion engine is deactivated due to an absence of load demand.

10 Claims, 3 Drawing Sheets

(51) Int. Cl.
　　*F02M 25/07*　　(2006.01)
　　*F02B 47/08*　　(2006.01)
　　*F01N 3/035*　　(2006.01)
　　*F01N 3/08*　　(2006.01)
　　*F01N 3/20*　　(2006.01)
　　*F02D 41/02*　　(2006.01)
　　*F02D 41/12*　　(2006.01)
　　*F02D 41/30*　　(2006.01)
　　*F02D 41/00*　　(2006.01)

(56) References Cited

U.S. PATENT DOCUMENTS

| | | | |
|---|---|---|---|
| 2008/0276602 A1* | 11/2008 | McCabe et al. | 60/295 |
| 2009/0205323 A1* | 8/2009 | Tsujimoto et al. | 60/286 |
| 2010/0275581 A1* | 11/2010 | Wada et al. | 60/276 |
| 2011/0209459 A1* | 9/2011 | Hancu et al. | 60/274 |
| 2012/0023906 A1* | 2/2012 | Yezerets et al. | 60/274 |

* cited by examiner

METHOD FOR ENRICHING THE EXHAUST GAS OF AN INTERNAL COMBUSTION ENGINE WITH REDUCING AGENT AND INTERNAL COMBUSTION ENGINE FOR PERFORMING SUCH A METHOD

CROSS REFERENCE TO RELATED APPLICATIONS

The present application claims priority to German Patent Application No. 102012212432.2, filed on Jul. 16, 2012, the entire contents of which are hereby incorporated by reference for all purposes.

FIELD

The disclosure relates to a method for enriching the exhaust gas of an internal combustion engine with a reducing agent.

BACKGROUND AND SUMMARY

Internal combustion engines may be equipped with various exhaust gas aftertreatment systems for reducing pollutant emissions. In spark-ignition engines catalytic reactors are used, which ensure oxidation of HC and CO even at low temperatures by using catalytic materials which increase the speed of certain reactions. If nitrogen oxides $NO_x$ are also to be reduced in addition, this can be achieved through the use of a three-way catalytic converter, which to do this, however, stoichiometric operation ($\lambda \approx 1$) of the spark-ignition engine is used running within tight limits. In this case the nitrogen oxides $NO_x$ are reduced by means of the unoxidized exhaust gas constituents present, that is to say by the carbon monoxides CO and the unburned hydrocarbons HC, these exhaust gas constituents being simultaneously oxidized.

Usually and in the context of the present disclosure the air ratio $\lambda$ is defined as the ratio of the air mass $m_{air,act}$ actually admitted to at least the one cylinder of the internal combustion engine to the stoichiometric air mass $m_{air,stoich}$, which would be required in order to just fully oxidize the fuel mass $m_{fuel}$ admitted to at least the one cylinder (stoichiometric operation of the internal combustion engine $\lambda=1$). Here $\lambda = m_{air,act}/m_{air,stoich}$ and with the stoichiometric air demand $L_{stoich}$, which is defined as $L_{stoich} = m_{air,stoich}/m_{fuel}$, the air ratio $\lambda = m_{air,act}/m_{fuel} * (1/L_{stoich})$.

In the case of internal combustion engines which are operated with an excess of air, for example diesel engines or direct-injection spark-ignition engines, but also in lean-burn spark-ignition engines, the nitrogen oxides $NO_x$ present in the exhaust gas cannot be reduced owing to the absence of reducing agents.

Consequently an exhaust gas aftertreatment system, for example a storage catalytic converter, which is also referred to as a lean NOx trap (LNT), may be provided for reducing the nitrogen oxides. Here the nitrogen oxides are at first absorbed, that is to say collected and stored, during lean-burn operation ($\lambda > 1$) of the internal combustion engine, before being reduced during a regeneration phase, for example by means of a sub-stoichiometric operation ($\lambda < 1$) of the internal combustion engine with oxygen deficiency, the unburned hydrocarbons HC and the carbon monoxide CO present in the exhaust gas serving as reducing agents.

Exhaust gas recirculation (EGR) and throttling of the charge air in the intake system afford further internal possibilities within the engine for enriching the exhaust gas with reducing agents, in particular with unburned hydrocarbons. Both measures reduce the charge air mass or fresh air mass fed through the internal combustion engine and thereby reduce the air ratio $\lambda$. Enrichment ensues due to reduction of the air mass supplied.

An enrichment of the exhaust gas with unburned hydrocarbons, also termed HC enrichment, can also be achieved by means of post-injection of additional fuel into at least one cylinder of the internal combustion engine. Here the post-injected fuel is not intended to be ignited in the combustion chamber by the main combustion still underway, or by the combustion gas temperatures, which are still high even after completion of the main combustion, but is to be introduced, unburned, into the exhaust gas discharge system upstream of the catalytic converter during the charge cycle.

Internal combustion engines which make use of post-injection are naturally prone to a dilution or contamination of the oil by unburned hydrocarbons. Depending on the quantity of post-injected fuel and the point of injection, a greater or lesser proportion of the post-injected fuel gets onto the inside wall of the cylinder, where it mixes with the adhering oil film and thus contributes to the oil dilution. Furthermore, the use of additional fuel as reducing agent is bound to increase the overall fuel consumption of the internal combustion engine.

With regard to the sub-stoichiometric operation ($\lambda < 1$) of the internal combustion engine, that is to say the enrichment, the initiation and maintenance of sub-stoichiometric operation can sometimes only be accomplished subject to restrictions, if at all. The reasons for this are diverse and vary as a function of the instantaneous load at which the internal combustion engine is being operated.

At low loads a stable combustion cannot be ensured when running with a rich mixture, particularly using compression ignition. Misfiring or incomplete combustion of the mixture may occur. The consequence is an undesirably high pollutant emission, particularly of unburned hydrocarbons HC. In the middle load range a load fluctuation often occurs. The transient operating conditions make it more difficult to maintain a constant air ratio and in some instances render any enrichment impossible. In the higher, high or top load range sub-stoichiometric operation is usually governed by the maximum admissible exhaust gas temperature, the exhaust gas temperature often being limited by components provided in the exhaust gas discharge system and their capacity to withstand thermal loads, for example by the turbine of an exhaust turbocharger, an exhaust gas aftertreatment system, or the exhaust gas recirculation system. It has to be borne in mind in this context that typically the exhaust gas temperature rises with any enrichment.

Internal measures within the engine can be dispensed with if the reducing agent is introduced directly into the exhaust gas discharge system, for example through the injection of additional fuel upstream of the LNT.

In the method and the internal combustion engine which form the subject matter of the present disclosure, the exhaust gas is enriched by introducing reducing agent into the exhaust gas discharge system upstream of at least the one exhaust gas aftertreatment system. Further measures for enriching the exhaust gas, particularly internal measures within the engine, may also be provided, however.

During the regeneration phase the nitrogen oxides ($NO_x$) are released and substantially converted into nitrogen dioxide ($N_2$), carbon dioxide ($CO_2$) and water ($H_2O$). The temperature of the storage catalytic converter should preferably lie within a temperature window between 200° C. and 450° C., so that on the one hand a rapid reduction is ensured and on the other hand no desorption takes place without conversion of the rereleased nitrogen oxides $NO_x$, something which can be triggered by too high temperatures.

One problem in using a storage catalytic converter arises from the sulfur contained in the exhaust gas, which is likewise absorbed and has to be regularly removed as part of a so-called desulfurization. For this purpose the storage catalytic converter is heated to high temperatures, usually between 600° C. and 700° C., and supplied with a reducing agent, for example unburned hydrocarbons. The high temperatures required for desulfurization can damage the storage catalytic converter, contribute to thermal ageing of the catalytic converter and significantly reduce the desired conversion of nitrogen oxides towards the end of its service life.

Although the problems resulting from enrichment by means of internal measures within the engine can be eliminated or moderated through the introduction of fuel, serving as reducing agent, directly into the exhaust gas discharge system, even this concept of exhaust gas enrichment is of only limited use, since the introduction of additional fuel into the hot exhaust gas and the accompanying exothermic reaction increase the already high temperature of the exhaust gas of an internal combustion engine in operation, possibly to values in excess of admissible exhaust gas temperatures, so that a thermal overload can occur. Reference is made to the comments already made above.

Instead of a storage catalytic converter or in addition to a storage catalytic converter, a selective catalytic converter, which is also referred to as an SCR catalytic converter, can be provided for reducing the nitrogen oxides. What has been stated in connection with the storage catalytic converter applies with regard to the supply of reducing agent. Besides unburned hydrocarbons, ammonia $NH_3$ and urea are used as reducing agents in order to reduce the nitrogen oxides selectively. The last-mentioned reducing agents are purposely introduced into the exhaust gas, that is to say directly into the exhaust gas discharge system.

The technical correlations described above illustrate that improved procedures for exhaust gas enrichment are needed, so that exhaust gas aftertreatment systems for reducing nitrogen oxides can be optimally supplied with reducing agent, in order to regenerate or desulfurize a storage catalytic converter, for example, or to supply a selective catalytic converter with unburned hydrocarbons or ammonia.

In the light of the comments above, the inventors herein provide an approach for regenerating an exhaust aftertreatment device that avoids exposure of the device to excessive temperatures while alleviating the combustion issues that may arise during rich operation. Accordingly, a method for enriching the exhaust gas of an internal combustion engine with a reducing agent is provided. The internal combustion engine comprises at least one cylinder having an intake system for admission of charge air, an exhaust gas discharge system for discharging exhaust gases, and at least one exhaust gas aftertreatment system for reducing nitrogen oxides arranged in the exhaust gas discharge system and which is periodically provided with a supply of reducing agent. The method comprises enriching the exhaust gas with the reducing agent in the exhaust gas discharge system upstream of at least the one exhaust gas aftertreatment system when a fuel supply of the at least one cylinder of the internal combustion engine is deactivated due to an absence of load demand.

According to the disclosure enrichment of the exhaust gas with reducing agent is not undertaken when the internal combustion engine is operating under load, but rather due to the absence of load demand when, with the fuel supply deactivated, no combustion is initiated in the cylinders of the internal combustion engine for lack of fuel, and the internal combustion engine functioning as a piston machine delivers charge air whilst consuming power. Enrichment of the exhaust gas is thereby performed in an operating mode of the internal combustion engine, which according to the state of the art is deemed unsuitable for an enrichment of the exhaust gas, since on the one hand fuel as reducing agent is entirely lacking due to deactivation of the fuel supply, and on the other hand exothermic heat resulting from the combustion, for raising the relevant temperatures, particularly of the exhaust gas and the exhaust gas aftertreatment system, is lacking due to the absence of fuel combustion.

However, the residual heat of the components, particularly at least the one exhaust gas aftertreatment system, proves to be sufficient. It even proves advantageous, according to the disclosure, for the reducing agent to be introduced into the exhaust gas discharge system when the internal combustion engine is not operating, since in this way the risk of thermal overload due to excessively high temperatures is reduced or eliminated altogether.

Here the reducing agent is not introduced into the hot exhaust gas discharged from the cylinders, but rather into the charge air fed through the internal combustion engine and into the exhaust gas discharge system, so that strictly speaking the method according to the disclosure involves charge air enrichment and not enrichment of the exhaust gas. Nonetheless, the term exhaust gas enrichment known from the state of the art is retained.

Both the disadvantages resulting from the provision of reducing agent by mean of internal measures within the engine, and the thermal overheating of components provided in the exhaust gas discharge system, particularly due to the direct introduction of reducing agent into the exhaust gas, are eliminated.

Moreover, using the method according to the disclosure in the normal operation of the internal combustion engine imposes fewer restrictions, since reducing agent for enriching the exhaust gas needs to be provided less frequently, if at all, and particularly under load demand no internal measures within the engine for HC-enrichment need to be implemented. It also has to be borne in mind here that enrichment during normal operation may be avoided, since the introduction of excess fuel is to be regarded as detrimental from various energy standpoints, particularly with regard to the efficiency of the internal combustion engine, but also with regard to the pollutant emissions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
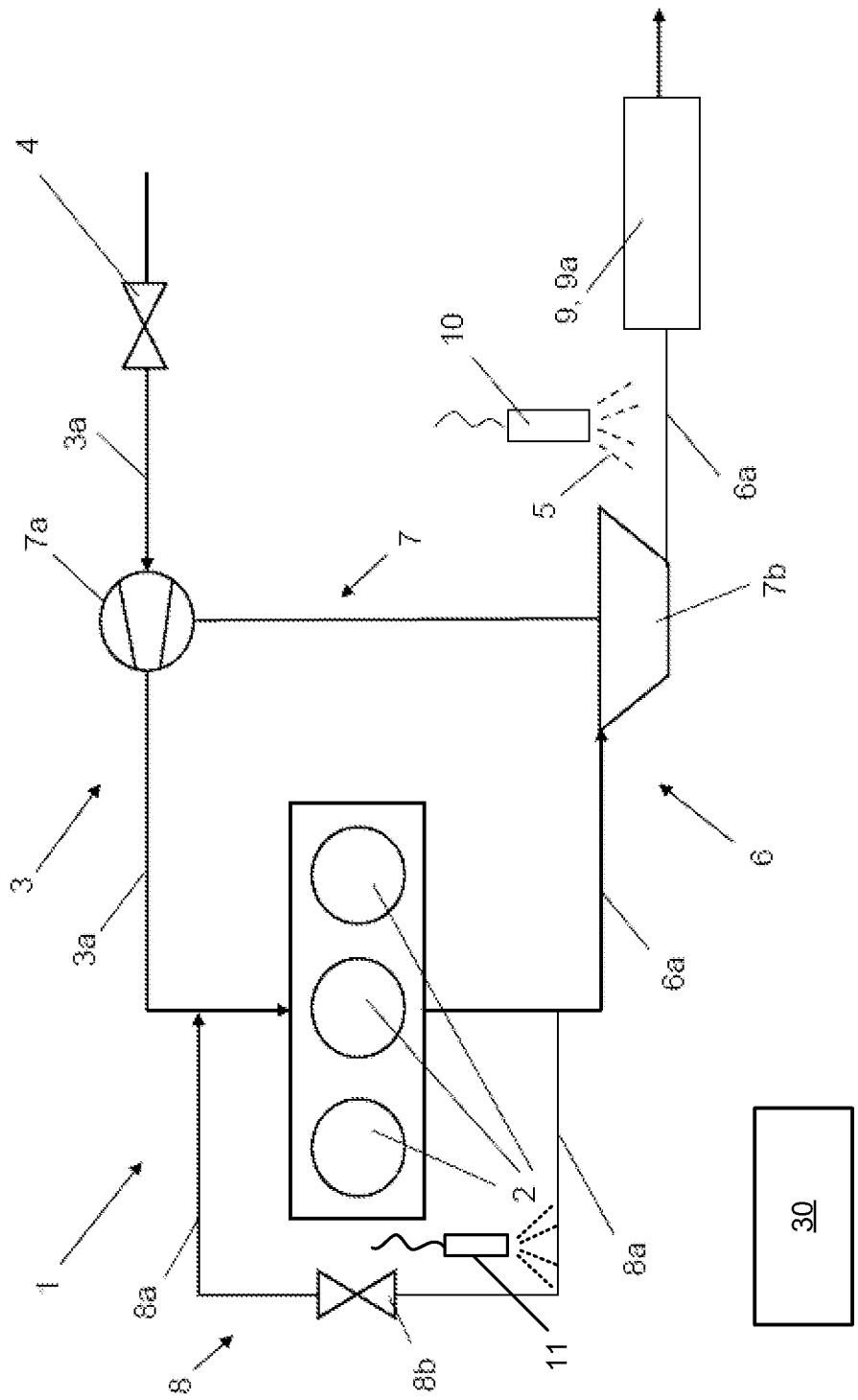
FIG. 1 schematically shows an embodiment of the internal combustion engine.

Regeneration of one or more exhaust aftertreatment devices, such as lean NOx traps or selective catalyst reduction systems, may be performed to purge stored NOx and/or SOx from the devices. In order to increase the operating conditions under which the devices may be regenerated, without sacrificing combustion stability or wasting excess fuel, regeneration may be performed during conditions of no load demand when fuel injection for combustion is deactivated. For example, during vehicle braking or deceleration events, fuel injection may be ceased, as combustion-generated torque is not needed to propel the vehicle. Regeneration may then be initiated during the fuel injection deactivation period by enriching the exhaust gas. The exhaust gas may be enriched via reductant injection and/or via reduction of the exhaust oxygen content by intake air throttling or activation of exhaust gas recirculation.

Embodiments of the method, in which a selective catalytic converter is used as exhaust gas aftertreatment system for reducing the nitrogen oxides, are advantageous. The efficiency and effectiveness of the exhaust gas aftertreatment by means of an SCR catalytic converter largely depend on the exhaust gas temperatures and in particular the temperature of the catalytic converter itself.

SCR catalytic converters are capable not only of reducing nitrogen oxides in the presence of a reducing agent, for example ammonia, but also, given suitable temperatures, of depositing and storing ammonia and releasing it as needed for reducing nitrogen oxides. In order to be able to deposit ammonia, specific minimum temperatures of the catalytic converter are required. At very high catalytic converter temperatures in excess of approximately 400° C., on the other hand, the catalytic converter releases deposited ammonia without reducing the nitrogen oxides. Both the ammonia released and the untreated exhaust gas containing nitrogen oxides are then discharged into the environment via the exhaust gas discharge system.

The aim is usually for catalytic converter temperatures of between 180° C. and 300° C., in order to ensure a satisfactory exhaust gas aftertreatment by means of an SCR catalytic converter.

Embodiments of the method, in which a storage catalytic converter is used as exhaust gas aftertreatment system for reducing the nitrogen oxides, are also advantageous. Reference is made to the comments above with regard to the storage catalytic converter and its particular features.

Storage catalytic converters and selective catalytic converters may also be used in combination with one another for exhaust gas aftertreatment.

Embodiments of the method in which ammonia is used as reducing agent are advantageous. Owing to the problems that occur with HC enrichment by means of internal measures within the engine and/or the direct introduction of fuel into the exhaust gas tract, SCR catalytic converters in which ammonia or urea serves as reducing agent are also used for reducing nitrogen oxides.

Owing to the toxicity of ammonia $NH_3$, ammonia is often not stored in its pure form in motor vehicles for provision as reducing agent. Instead urea is often used as basic product for the production of ammonia since, with the input of energy in the course of a thermolytic reaction, urea is broken down into ammonia and isocyanic acid, it being possible to recover ammonia $NH_3$ from the isocyanic acid in the presence of water.

A distinction can be made between two fundamentally differing concepts in the provision of urea for producing ammonia. On the one hand the urea may be stored and provided in liquid form, that is to say as an aqueous solution, the urea being introduced as an aqueous solution into the exhaust gas discharge system upstream of the SCR catalytic converter. On the other hand it is possible to make the urea available in solid form. Urea in solid form has a smaller volume and is characterized by a higher ammonia content compared to the aqueous solution. The storage reservoir can therefore be designed with a smaller storage volume, which represents a substantial advantage particularly with a view to use in motor vehicles, in which compact and effective packaging is an aim.

Both concepts rely on the introduction of heat into the urea, in order to produce ammonia. In certain operating modes this can present problems. Thus temperatures of approximately 150° C. to 170° C. are used in order to vaporize an aqueous urea solution introduced upstream of an SCR catalytic converter and to produce ammonia $NH_3$. In the case of diesel engines, generating and reaching the needed exhaust gas temperatures at the aforementioned level in urban traffic may present problems, particularly after cold-starting.

It follows from this that it is advantageous and desirable to deposit as much ammonia as possible in the SCR catalytic converter, that is to say to build up and maintain a large store of ammonia in the catalytic converter, so as to be able to make sufficient ammonia available for reducing the nitrogen oxides in operating modes, in which the temperatures are too low for the introduction and vaporization of an aqueous urea solution and/or the temperatures of the SCR catalytic converter are too low for the deposition of ammonia.

Embodiments of the method in which fuel is used as reducing agent fuel are also advantageous. Owing to the toxicity of ammonia and to the fact that not only nitrogen oxides but also ammonia gets into the environment in the event of a malfunction of an SCR catalytic converter, it may be advantageous to use fuel as reducing agent. An additional reservoir for the storage of reducing agent can be dispensed with if fuel is used for the reduction.

Embodiments of the method, in which overrun conditions of the internal combustion engine represent an operating mode in which the fuel supply of at least the one cylinder of the internal combustion engine is deactivated due to the absence of load demand, and enrichment of the exhaust gas can be achieved by means of reducing agents, are advantageous.

Embodiments of the method, in which engine braking of a vehicle using the internal combustion engine represent an operating mode in which the fuel supply of at least the one cylinder of the internal combustion engine is deactivated due to the absence of load demand and enrichment of the exhaust gas can be achieved by means of reducing agents, are advantageous.

In internal combustion engines having a throttle element in the intake system embodiments of the method, in which the charge air admitted via the intake system is restricted by means of a throttle element in the course of the exhaust gas enrichment, are advantageous.

According to this variant of the method the enrichment of the charge air fed through the internal combustion engine with reducing agent is supported by an internal measure within the engine, which can be used for enrichment in the normal operation of the internal combustion engine. As a rule, in order to shift the internal combustion engine into substoichiometric operation the air ratio λ is reduced by increasing the fuel injection quantity. In principle, however, the air ratio λ may also be reduced by reducing the air mass provided. In this instance the latter procedure is used analogously in the method according to the disclosure.

The fact that the charge air quantity delivered through the exhaust gas aftertreatment system is reduced by throttling means firstly that less reducing agent is required in order to achieve a predefined concentration of reducing agent in the charge air flow. Secondly the relevant spatial velocity for conversion is reduced due to the reduced air flow, so that the conversion rate and hence the quality of the exhaust gas aftertreatment is increased.

The following variant of the method is also advantageous for similar reasons to those stated above. If the internal combustion engine is equipped with exhaust gas recirculation, which comprises a return line, which branches off from the exhaust gas discharge system forming a branch and opens into the intake system, embodiments of the method, in which the exhaust gas recirculation is activated in the course of exhaust gas enrichment and is opened for the purpose of returning charge air, are advantageous.

By activating any exhaust gas recirculation provided, charge air is returned in the course of exhaust gas enrichment, so that the charge air quantity fed through the exhaust gas aftertreatment system is reduced. By reducing charge air quantity, less reducing agent may be used in order to enrich the charge air flow with reducing agent in the desired concentration. The relevant spatial velocity for the conversion in turn diminishes.

In this context embodiments of the method, in which the reducing agent for enriching the exhaust gas is introduced into the exhaust gas discharge system upstream of the branching of the return line, are advantageous.

If the exhaust gas recirculation is activated in the course of exhaust gas enrichment, reducing agent is also returned with the charge air, that is to say charge air enriched with reducing agent air is returned.

Also advantageous in this context are embodiments of the method, in which the reducing agent for enriching the exhaust gas is introduced into the exhaust gas discharge system downstream of the branching of the return line. Less reducing agent is required.

The control of the exhaust gas enrichment according to the disclosure may be both a closed-loop control and a feedforward open-loop control. Monitoring in the control, especially the open-loop control, may serve to identify not only the position of a throttle valve provided in the intake system, but also the position of an EGR valve, which is arranged in any exhaust gas recirculation provided. The charge air quantity fed through the internal combustion engine and the exhaust gas aftertreatment system during enrichment of the exhaust gas can be used as a control variable, particularly in the context of a closed-loop control, it being possible to register the charge air quantity by means of an air mass sensor. The charge air quantity is preferably reduced by means of throttling and/or EGR during enrichment of the exhaust gas to an extent which allows a smooth transition to the engine operating mode of the internal combustion engine, as soon as this is desired or necessary.

In embodiments, the above described method may be performed in an internal combustion engine comprising at least one cylinder, an intake system for the admission of charge air, an exhaust gas discharge system for discharging the exhaust gases, at least one exhaust gas aftertreatment system for reducing nitrogen oxides, which is arranged in the exhaust gas discharge system and which at least periodically utilizes a supply of reducing agent, and a device for introducing reducing agent into the exhaust gas discharge system upstream of at least the one exhaust gas aftertreatment systems for the purpose of exhaust gas enrichment.

What has been said with regard to the method according to the disclosure also applies to the internal combustion engine according to the disclosure, for which reason general reference is made at this juncture to the statements made with regard to the variants of the method.

Embodiments of the internal combustion engine, in which a throttle element is provided in the intake system, are advantageous. The throttle element serves to reduce the charge air quantity in the course of enrichment with reducing agent.

Embodiments of the internal combustion engine, in which at least one supercharging device is provided, are advantageous. Supercharging serves primarily to boost the power output of the internal combustion engine. In the process the air needed for the combustion process is compressed, so that a greater mass of air can be admitted to each cylinder per working cycle. The fuel mass and hence the mean pressure can thereby be increased. Supercharging is a suitable means for increasing the power output of an internal combustion engine for the same engine displacement, or of reducing the engine displacement for the same power output. In either case supercharging leads to an increase in the power-to-volume ratio and a more favorable power-to-weight ratio. For the same vehicle constraints the load spectrum can thereby be shifted towards higher loads at which the specific fuel consumption is lower.

An exhaust turbocharger, for example, and/or a compressor may be used as supercharging device.

Embodiments of the internal combustion engine, in which at least one exhaust turbocharger is provided as supercharging device, are particularly advantageous. An exhaust turbocharger comprises a compressor and a turbine, which are arranged on the same shaft. The hot exhaust gas flow is fed to the turbine and expands, releasing energy in the turbine, thereby causing shaft to rotate. The energy released from the exhaust gas flow to the turbine and ultimately to the shaft is used to drive the compressor, also arranged on the shaft. The compressor delivers and compresses the charge air fed to it, thereby supercharging the cylinders. If necessary, charge air cooling is provided, which serves to cool the compressed combustion air before it enters the cylinders.

Various measures can be taken to optimize the torque characteristic of a supercharged internal combustion engine; for example by designing the turbine with a small cross section in conjunction with exhaust gas blow-off, but in particular through the use of multiple exhaust turbochargers, the turbines of which are arranged in parallel or in series.

Embodiments of the internal combustion engine, in which exhaust gas recirculation is provided, which comprises a return line, which branches off from the exhaust gas discharge system forming a branch and opens into the intake system, are advantageous.

Basically in normal operation, that is to say in the operating mode of the internal combustion engine, exhaust gas recirculation is a concept for reducing the nitrogen oxide emissions, in which the nitrogen oxide emissions can be significantly reduced as the exhaust gas recirculation rate increases. The exhaust gas recirculation rate $x_{EGR}$ here is defined as $x_{EGR}=m_{EGR}/(m_{EGR}+m_{fresh\ air})$, where $m_{EGR}$ denotes the mass of recirculated exhaust gas and $m_{fresh\ air}$ denotes the fresh air admitted. In order to achieves a significant reduction of the nitrogen oxide emissions, high exhaust gas recirculation rates are necessary, which may lie in the order of magnitude of $x_{EGR} \approx 60\%$ to 70%, for which reason cooling of the recirculated exhaust gas is also often provided.

If exhaust gas is recirculated for reducing the untreated nitrogen oxide emissions, the absolute exhaust gas mass fed through the catalytic converter diminishes, so that the relevant dwell time for conversion in the catalytic converter increases. It may be borne in mind, moreover, that owing to the exhaust gas recirculation the exhaust gas has a lower nitrogen oxide concentration. Both lead to a reduction in the quantity of pollutants present in the aftertreated exhaust gas that is introduced into the environment.

In the case of internal combustion engines with exhaust turbocharging a distinction can be made between two fundamentally differing concepts of exhaust gas recirculation. The recirculated exhaust gas can be extracted from the exhaust pipe by means of high-pressure EGR upstream of the turbine and recirculated, or it may be extracted by means of low-pressure EGR downstream of the turbine.

In the case of exhaust gas recirculation by means of high-pressure EGR the recirculated exhaust gas is no longer available to drive the turbine. In the event of an increase in the exhaust gas recirculation rate, the exhaust gas flow introduced into the turbine diminishes further. The diminished exhaust gas mass flow through the turbine results in a smaller turbine pressure ratio, so that the boost pressure ratio and thereby the boost pressure likewise diminish.

In contrast to the high-pressure EGR, which extracts exhaust gas from the exhaust gas discharge system upstream of the turbine and introduces it into the intake system downstream of the compressor, in the case of a low-pressure EGR exhaust gas which has already flowed through the turbine is returned to the inlet side. For this purpose the low-pressure EGR comprises a return line, which branches off from the exhaust system downstream of the turbine and opens into the intake system upstream of the compressor.

The exhaust gas returned to the inlet side by means of low-pressure EGR is mixed with fresh air upstream of the compressor. The mixture of fresh air and recirculated exhaust gas produced in this way forms the charge air, which is fed to the compressor and compressed. Low-pressure EGR preferably uses exhaust gas which has been subjected to exhaust gas aftertreatment downstream of the turbine, so as not to foul the compressor and so impair the efficiency of the compressor.

Embodiments of the internal combustion engine in which the device for introducing reducing agent is provided upstream of the branching of the return line are advantageous. Also advantageous are embodiments of the internal combustion engine in which the device for introducing reducing agent is provided downstream of the branching of the return line.

FIG. 1 schematically shows an embodiment of the internal combustion engine 1, which has three cylinders 2 arranged in-line. The cylinders 2 are supplied with charge air via the intake system 3. An exhaust gas discharge system 6 serves for discharging the exhaust gases from the cylinders 2. The cylinders 2 are supplied with fuel via a fuel injection system (not shown). The fuel may be diesel fuel, gasoline, or other suitable fuel injected via direct and/or port fuel injectors coupled to the cylinders.

An exhaust gas aftertreatment system 9 for reducing nitrogen oxides, which at least from time to time (e.g., periodically in response to an indication to regenerate the aftertreatment system, such as once every minute, once every engine cycle, once every engine operation, etc.) utilizes a supply of reducing agent 5, is provided in the exhaust gas discharge system 6. Here a storage catalytic converter 9a is used as exhaust gas aftertreatment system 9 for reducing nitrogen oxides and fuel is used as reducing agent 5. However, in other examples, reducing agent may be provided directly to the cylinders (via the fuel injectors, for example) or to the exhaust gas recirculation system. For example, an injector 11 may be provided in the EGR return line 8a.

The internal combustion engine 1 represented in FIG. 1 is supercharged by means of an exhaust turbocharger 7 and is moreover equipped with a high-pressure EGR 8. The supercharger 7 has a turbine 7b, arranged in an exhaust pipe 6a of the exhaust gas discharge system 6, and a compressor 7a arranged in an inlet pipe 3a of the intake system 3. The high-pressure EGR 8 is formed by the provision of a return line 8a, which branches off from the exhaust pipe 6a upstream of the turbine 7b and opens into the inlet pipe 3a of the intake system 3 downstream of the compressor 7a, and in which a shut-off element 8b serving as EGR valve 8b is arranged, which in the engine operating mode of the internal combustion engine 1 serves for adjustment of the quantity of exhaust gas recirculated by means of the EGR 8 and during the enrichment with reducing agent 5 serves for adjustment of the charge air quantity returned via the return line 8a.

The storage catalytic converter 9a is arranged downstream of the turbine 7b in the exhaust pipe 6a, a device 10 for introducing reducing agent 5 into the exhaust gas discharge system 6 being provided upstream of the catalytic converter 9a between the turbine 7b and the catalytic converter 9a.

An engine controller 30 includes a microprocessor unit, input/output ports, an electronic storage medium for executable programs and calibration values e.g., a read only memory chip, random access memory, keep alive memory, and a data bus. Controller 30 may receive various signals from sensors coupled to engine 1, including measurement of inducted mass air flow (MAF) from a mass air flow sensor; engine coolant temperature (ECT) from a temperature sensor; a profile ignition pickup signal (PIP) from a Hall effect sensor (or other type) coupled to the engine crankshaft; throttle position (TP) from a throttle position sensor; and absolute manifold pressure signal, MAP, from a pressure sensor. Engine speed signal, RPM, may be generated by controller 30 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, the Hall effect sensor, which is also used as an engine speed sensor, may produce a predetermined number of equally spaced pulses every revolution of the crankshaft. Controller 30 may send signals to control various engine actuators, including EGR valve 8b, throttle 4, device 10, and the fuel injection system.

The storage medium read-only memory of controller 30 can be programmed with computer readable data representing instructions executable by the processor for performing the methods described below as well as other variants that are anticipated but not specifically listed.

Figure 2:
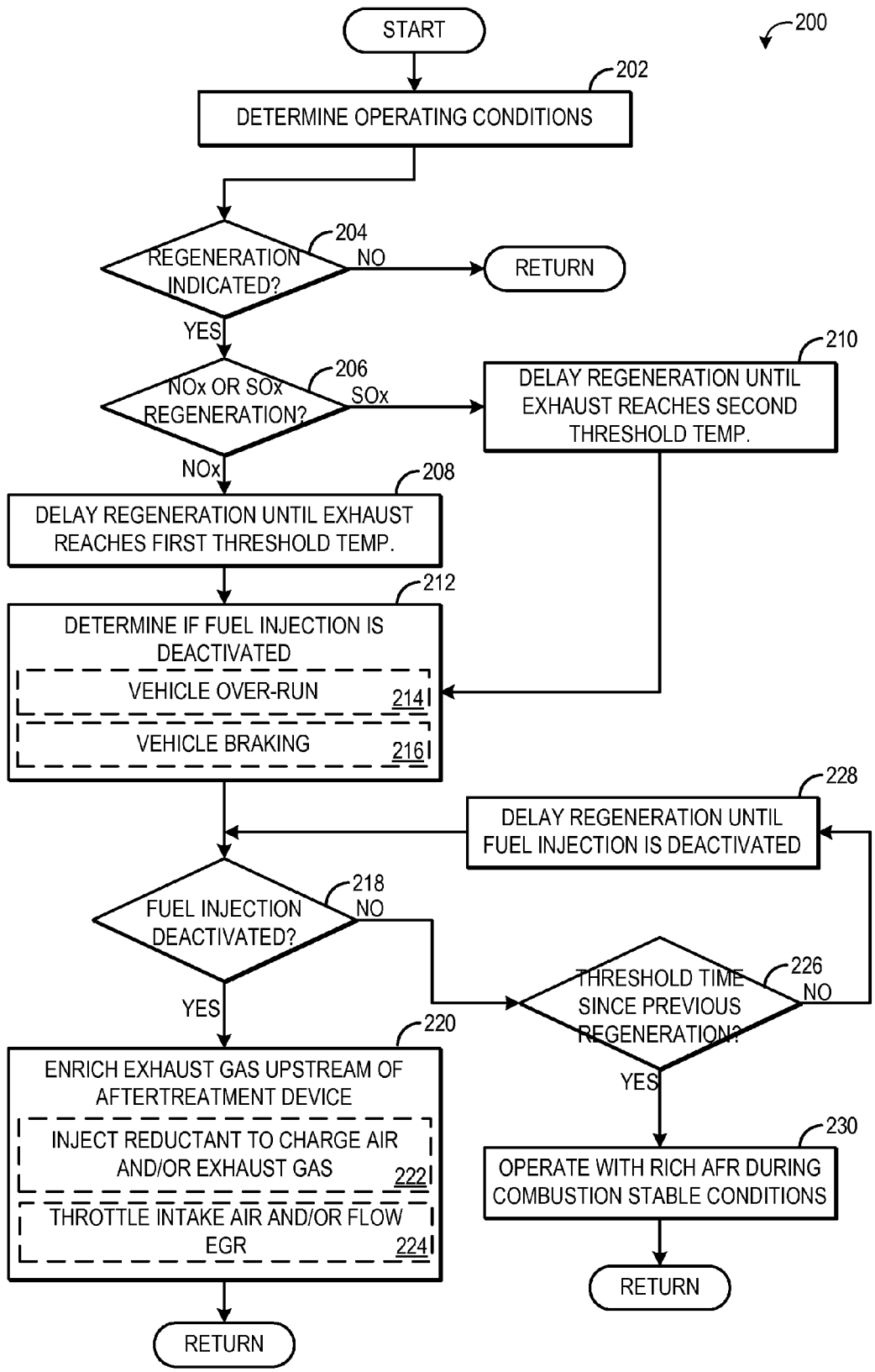
FIG. 2 is a flow chart illustrating a method for regenerating an exhaust aftertreatment device according to an embodiment of the present disclosure.

Turning to FIG. 2, a flow chart illustrating a method 200 for performing a regeneration of an exhaust aftertreatment device is presented. Method 200 may be carried out by a controller, such as controller 30, according to instructions stored thereon in order to perform a regeneration of an exhaust aftertreatment device, such as exhaust aftertreatment system 9 of FIG. 1. Example exhaust aftertreatment devices that may be regenerated according to the following method include lean NOx traps (LNTs), selective catalytic reduction (SCR) devices, particulate filters, and other storage devices or catalysts.

At 202, method 200 includes determining engine operating parameters. The engine operating parameters determined may include, but are not limited to, engine speed and load, operator-requested torque, current air-fuel ratio, time since a previous regeneration of the exhaust aftertreatment device, NOx and/or SOx load on the aftertreatment device, fuel injection status, and other parameters.

At 204, it is determined if a regeneration of the aftertreatment device is indicated. The aftertreatment device may be regenerated responsive to an indication that a NOx or SOx load is above a threshold (where the NOx and/or SOx load is determined based on feedback from one or more exhaust gas sensors) or responsive to an elapsed time since a previous regeneration. For example, a regeneration may be carried out after a threshold amount of time since a previous regeneration has elapsed. If no regeneration is indicated, method 200 returns. If a regeneration is indicated, method 200 proceeds to 206 to determine if the regeneration is indicated to convert stored NOx only, or to convert SOx (and in some embodiments, also NOx). As explained previously, NOx regeneration may be carried out at a lower temperature than SOx regeneration. Further, NOx regeneration may be carried out more frequently than SOx regeneration.

If a NOx-only regeneration is indicated, method 200 proceeds to 208 to delay regeneration until the exhaust gas reaches a first threshold temperature. For example, as explained previously, NOx regeneration may be performed when exhaust gas is at an optimal temperature for converting stored NOx without reabsorbing the released NOx, such as between 150° and 400° C. Thus, if the engine is operating under cold start conditions, the regeneration may be delayed until the exhaust has warmed to a sufficient temperature. Similarly, if SOx regeneration is indicated, method 200 includes, at 210, delaying regeneration until the exhaust gas reaches a second threshold temperature, higher than the first threshold temperature. For example, SOx regeneration may optimally occur at higher temperatures, such as above 400° C.

After a desired exhaust temperature has been reached, both 208 and 210 proceed to 212 to determine if fuel injection is deactivated. Fuel injection deactivation may occur in response to an engine shutdown request (such as a key-off event). However, during engine operation, fuel injection may be transiently deactivated in order to conserve fuel when engine load or operator-requested torque is low (or absent). Such fuel deactivation conditions may include the engine continuing to spin and pump air to the exhaust, but without combustion in the cylinders. Example conditions when fuel injection may be deactivated include during over-run conditions, as indicated at 214, and during vehicle braking, as indicated at 216. Over-run conditions include when the vehicle is propelled without a torque request from an operator, such during vehicle coasting or during a deceleration event where the operator releases the acceleration pedal. Other conditions where fuel injection may be deactivated include a switch from a fuel-engine powered mode to a battery mode in a hybrid vehicle, or during an automatic stop in a vehicle configured to automatically stop and start during long idle periods. In some embodiments, fuel injection deactivation may include deactivation of fuel injection to all cylinders of the engine. However, in other cylinders, fuel injection deactivation may include deactivation of a subset of the cylinders of the engine.

At 218, it is determined if the fuel injection has been deactivated. If fuel injection has been deactivated, method 200 proceeds to 220 to enrich the exhaust gas upstream of the aftertreatment device in order to regenerate the device. The enrichment may include addition of reductant to the exhaust gas as indicated at 222, such as fuel, ammonia, or urea injection to the exhaust gas via injection to the exhaust system upstream of the device, or fuel injection to the charge air via injection to the cylinders or to the exhaust gas recirculation (EGR) system upstream of the engine intake. The enrichment may additionally or alternatively include reduction in the oxygen content of the exhaust gas via throttling of intake air (e.g., closing a throttle valve) and/or activation of EGR (e.g., opening an EGR valve), as indicated at 224.

The exhaust gas may be maintained at a target air-fuel ratio during the duration of the regeneration. For example, the mass air flow (MAF) of the intake air and oxygen concentration of the exhaust may be monitored to determine the air-fuel ratio and overall reductant concentration of the exhaust gas at the aftertreatment device, and the amount of reductant and/or oxygen content of the exhaust may be adjusted based on this feedback to maintain the target air-fuel ratio. The regeneration may be carried out for a specified time period, or may be carried out until one or more sensors downstream of the aftertreatment device (e.g., a NOx or oxygen sensor) indicates regeneration is complete. Method 200 then returns.

Returning to 218, if it is determined that fuel injection is not deactivated, method 200 proceeds to 226 to determine if a threshold time since a previous regeneration has elapsed. If the threshold time has not elapsed, method 200 proceeds to 228 to delay regeneration until the fuel injection is deactivated, and then method 200 loops back to 218 to continue to monitor for deactivation of fuel injection. If the threshold amount of time since a previous regeneration has elapsed, method 200 proceeds to 230 to operate the engine with rich exhaust gas (via rich combustion or injection of reductant to the exhaust). If the exhaust is made rich by running the engine with rich combustion, the regeneration may be carried out during combustion stable conditions, such as during medium load operation, to avoid misfire, excess emissions, or other combustion issues. Method 200 then returns.

Figure 3:
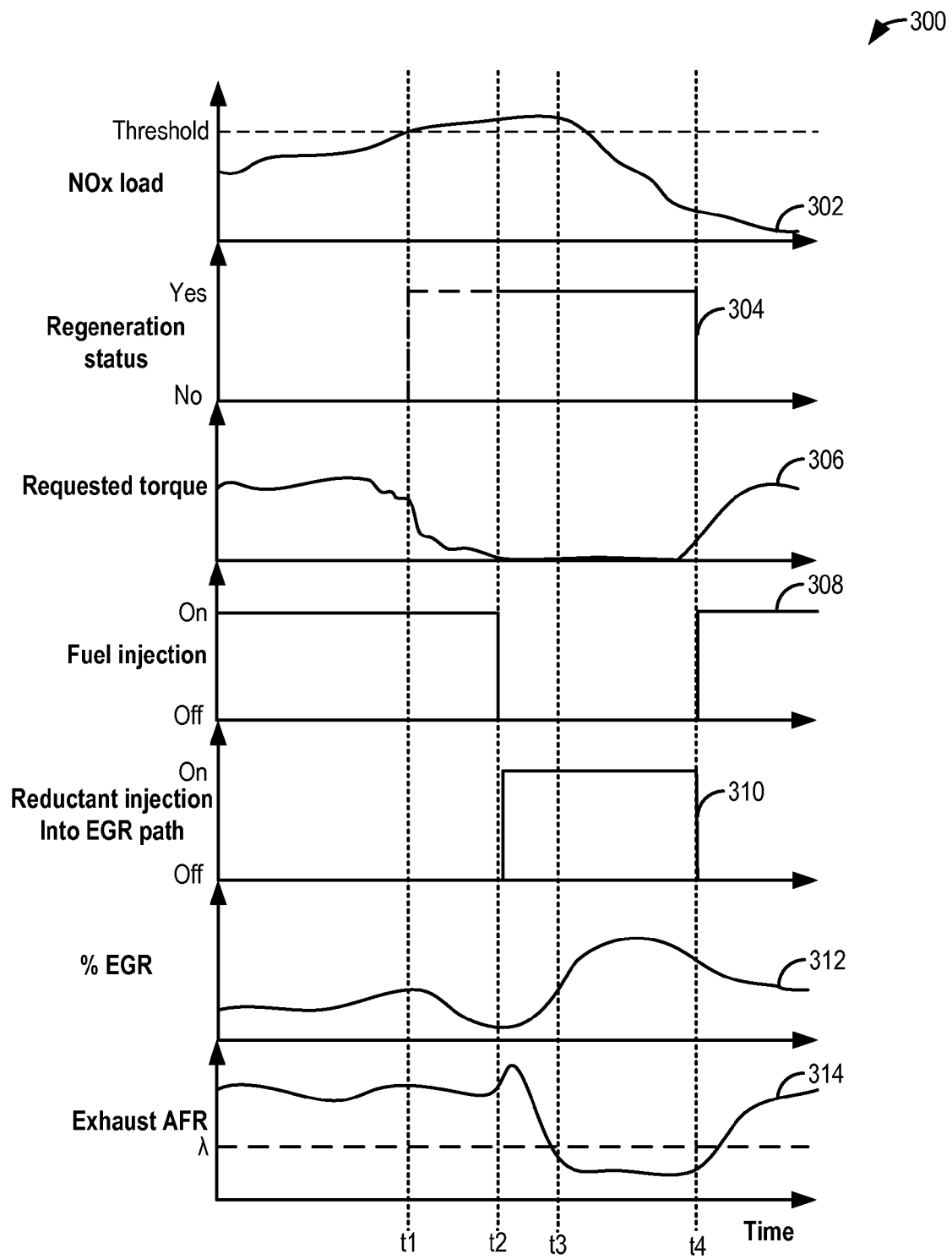
FIG. 3 is a diagram illustrating operating parameters of interest during an engine operation according to an embodiment of the present disclosure.

FIG. 3 is a diagram 300 illustrating engine operating parameters of interest during a regeneration of an exhaust aftertreatment device disposed in an exhaust path downstream of an engine. In one example, the parameters illustrated in diagram 300 may be observed during the execution of method 200 of FIG. 2. In the example illustrated in FIG. 3, the reductant injected to initiate regeneration is fuel injected into the EGR system.

Diagram 300 illustrates NOx load on the aftertreatment device at curve 302, a regeneration status for the aftertreatment device at curve 304, requested torque at curve 306, cylinder fuel injection status at curve 308, reductant injection status at curve 310, % EGR at curve 312, and exhaust air-fuel ratio at curve 314. Time is illustrated along the horizontal axis of FIG. 3, and values of each respective operating parameter are illustrated along the vertical axis.

Prior to time t1, the NOx load on the aftertreatment device is below a threshold (illustrated by curve 302), and as such a regeneration request is not indicated, as shown in curve 304. Because the aftertreatment device is not undergoing regeneration, reductant injection is also off (shown by curve 310). Also prior to time t1, the engine is operating under normal operating conditions, with operator-requested torque above a threshold (e.g., zero). Requested torque, which is illustrated by curve 306, may be determined based on a position of an accelerator pedal, based on engine speed and load, or other parameters. Fuel injection is on (as shown by curve 308), indicating fuel is injected to the cylinders for combustion to produce power to propel the vehicle in which the engine is installed. To reduce the amount of NOx produced by the engine, EGR is flowing, although at a relatively low percentage, as shown by curve 312. As the engine is a lean-burn engine (e.g., diesel), exhaust air-fuel ratio, shown by curve 314, is greater than stoichiometry (λ) prior to time t1.

At time t1, the NOx load reaches the load threshold, and as a result a request to regenerate the aftertreatment device is generated, shown by the dashed portion of curve 304. However, because the requested torque is still relatively high and fuel injection to the cylinders is still active, the regeneration is delayed until time t2. At time t2, the vehicle operator may indicate that a small amount or no torque is needed to propel the vehicle at a desired speed. For example, the operator may decelerate the vehicle by lifting up on the accelerator pedal, depressing a brake pedal, etc. As a result, requested torque may decrease to a threshold level (such as zero). When the requested torque reaches the threshold level, fuel injection to the cylinders may be shut off. By shutting off fuel injection during a low or no load condition, fuel economy may be increased. Thus, at time t2, fuel injection for combustion is deactivated.

During the fuel deactivation period, regeneration of the downstream exhaust aftertreatment device is carried out, and thus the regeneration status switches from a request (dashed line) to carrying out the actual regeneration (solid line of curve 304). As explained previously, a LNT or SCR device may be regenerated by introducing reductant in the exhaust upstream of the device. If the exhaust temperature is sufficiently high, the reductant may react with released NOx in the aftertreatment device, and the NOx may be converted into less-toxic constituents and released to atmosphere. The aftertreatment regeneration may be carried out every time fuel injection is deactivated, or may be carried out responsive to fuel injection deactivation and one or more of a NOx load on the aftertreatment device being above a load threshold and a temperature of the exhaust being above a threshold temperature.

According to the sequence illustrated in diagram 300, regeneration is initiated following the fuel injection deactivation at time t2. To regenerate the aftertreatment device, the exhaust is enriched with reductant. Thus, after time t2, reductant injection is activated. While the sequence in FIG. 3 regenerates the device by injecting reductant into the EGR path, other injection locations are possible, such as directly to the cylinders, or to the exhaust upstream of the aftertreatment device. If reductant (e.g., fuel) is injected to the cylinders, it may be injected late (when the cylinder is after top dead center, for example) to prevent combustion of the fuel. Further, at time t2, the EGR amount is increased to further enrich the exhaust. As a result, at time t3, the exhaust air-fuel ratio decreases to below stoichiometry. Enrichment of the exhaust may alternatively or additionally include decreasing the oxygen content of the intake air by throttling the intake air.

At time t4, regeneration of the device is complete, reductant injection is halted, and the EGR amount is returned to an amount based on desired intake oxygen content for emission control. Further, at time t4 the operator requests additional torque (by depressing the accelerator pedal, for example), and as a result fuel injection for combustion resumes. Finally, the exhaust air-fuel ratio returns to lean. In some examples, the regeneration of the aftertreatment device may continue after the fuel injection resumes.

Thus, regeneration of an exhaust aftertreatment device may be carried out during a low or no load period where fuel injection for combustion is halted. By carrying out regeneration during periods of fuel injection deactivation, the temperature in the aftertreatment device may maintained below an upper limit, reducing degradation to exhaust system components.

According to the system and method described herein, an embodiment of a method for an engine comprises responsive to a transient deactivation of fuel injection, enriching engine exhaust gas to regenerate a an exhaust aftertreatment device disposed in an exhaust path downstream of the engine. The enriching of the engine exhaust gas may be further responsive to a NOx load on the exhaust aftertreatment device being above a threshold. The fuel injection may be transiently deactivated responsive to an engine deceleration event.

In an example, the enriching the engine exhaust gas comprises injecting a reductant to the engine exhaust gas upstream of the exhaust aftertreatment device. In another example, the enriching the engine exhaust gas comprises injecting a reductant into recirculated exhaust gas upstream of an engine intake. In one example, the enriching the engine exhaust gas comprises one or more of closing an intake throttle valve and opening an exhaust gas recirculation valve.

Another embodiment of method for an engine comprises responsive to a request to regenerate an exhaust aftertreatment device, delaying regeneration of the exhaust aftertreatment device until fuel injection to the engine is deactivated. The delaying regeneration of the exhaust aftertreatment device may further comprise delaying regeneration of the exhaust aftertreatment device until exhaust gas temperature reaches a threshold temperature and fuel injection to all cylinders is deactivated.

The method may also comprise, after fuel injection is deactivated, maintaining exhaust gas upstream of the exhaust aftertreatment device at a rich air-fuel ratio, the exhaust gas maintained at the rich air-fuel ratio by one or more of reductant injection to the exhaust gas, throttling of intake air, and flowing of exhaust gas recirculation.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
responsive to a transient deactivation of fuel injection, enriching engine exhaust gas to regenerate an exhaust aftertreatment device disposed in an exhaust path downstream of the engine, the enriching the engine exhaust gas comprising injecting a reductant via an injector into recirculated exhaust gas upstream of an engine intake.

2. The method of claim 1, wherein the enriching of the engine exhaust gas is further responsive to a NOx load on the exhaust aftertreatment device being above a threshold.

3. The method of claim 1, wherein enriching the engine exhaust gas further comprises injecting a reductant to the engine exhaust gas upstream of the exhaust aftertreatment device.

4. The method of claim 1, wherein enriching the engine exhaust gas further comprises one or more of closing an intake throttle valve and opening an exhaust gas recirculation valve.

5. The method of claim 1, further comprising transiently deactivating the fuel injection responsive to an engine deceleration event.

6. A method for an engine, comprising:
responsive to a transient deactivation of fuel injection, enriching engine exhaust gas to regenerate an exhaust aftertreatment device disposed in an exhaust path downstream of the engine, the enriching including opening an exhaust gas recirculation valve and injecting a reductant into recirculated exhaust gas upstream of an engine intake.

7. The method of claim 6, wherein the enriching of the engine exhaust gas is further responsive to a NOx load on the exhaust aftertreatment device being above a threshold.

8. The method of claim 6, wherein enriching the engine exhaust gas further comprises injecting a reductant to the engine exhaust gas upstream of the exhaust aftertreatment device.

9. The method of claim 6, wherein enriching the engine exhaust gas further comprises closing an intake throttle valve.

10. The method of claim 6, further comprising transiently deactivating the fuel injection responsive to an engine deceleration event.

* * * * *